Nov. 11, 1969   J. P. McCARTIN   3,477,305
SPHERICAL WORM AND PIN GEAR INDEXING APPARATUS
Filed Dec. 22, 1967   2 Sheets-Sheet 1

INVENTOR.
JOSEPH P. McCARTIN

INVENTOR.
JOSEPH P. McCARTIN

United States Patent Office 3,477,305
Patented Nov. 11, 1969

3,477,305
SPHERICAL WORM AND PIN GEAR INDEXING APPARATUS
Joseph P. McCartin, 43—29 158th St., Flushing, N.Y. 11358
Filed Dec. 22, 1967, Ser. No. 692,880
Int. Cl. F16h 1/12
U.S. Cl. 74—426                        7 Claims

ABSTRACT OF THE DISCLOSURE

A compact and intermittent motion, right-angle indexing device for use in the precision indexing of machine tools having a roller gear with a concave profile with equally spaced cam ribs formed within the contour of the gear so that the slots between the cam ribs will engage a plurality of cam followers which project into the concave area from a corresponding cam follower wheel. The cam ribs include a gradual transition area which connects adjacent ribs to form a continuous slot within the roller gear so that cam followers will advance the cam wheel one position for each rotation of the roller gear during the operation of the indexing components.

---

This invention relates to a compact and intermittent motion, right-angle indexing device for use in the precision indexing of machine apparatus.

More specifically this invention relates to a right-angle, gear index drive which utilizes a modified trapezoidal cam contour having a high mechanical gear reduction with respect to its size for producing precision and high torque cam indexing.

Convention gear indexing drives used in machinery often produce a great deal of heat because of the mechanical wear of the engaging elements due to friction. Moreover accuracy of conventional indexing devices deteriorates during use as a result of wear and thus causes undesirable backlash between the drive components. Right angle gear index drives which are utilized in applications requiring high mechanical gear ratios between input and output components generally require unusually large cam follower wheels which occupy large operating space when applied to a processing or packaging machine. The output torque of conventional right angle gear index drives is also limited by one or two cam followers which engaged the roller gear during any portion of their intermittent operating cycle.

Accordingly, the present invention provides an improved right-angle gear index drive which utilizes a modified trapezoidal cam contour on its roller gear to permit the multiple engagement of a plurality of cam followers to the cam ribs or threads of the roller gear so that loads requiring high torque may be driven. Moreover the apparatus according to the invention, permits the use of high mechanical gear ratios by the use of compact drive components. The roller gear has been constructed with a circularly concave profile having an internal radius corresponding with the radius of the cam follower wheel so that multiple engagement of a plurality of cam followers is effected. This feature permits the precision indexing of the cam follower wheel with respect to the roller gear with negligible backlash between the components.

It is therefore an object, according to the present invention to provide a compact right angle gear index drive which produces an intermittent indexing motion with negligible friction and backlash.

It is another object according to the present invention to provide a right angle gear index drive which permits multiple engagement of cam followers to its roller gear.

It is a further object, according to the present invention, to provide a right angle gear index drive utilizing a modified trapezoidal cam contour capable of driving loads requiring high torque.

It is still a further object according to the present invention to provide a right angle gear index drive which overcomes many of the disadvantages of conventional gear index drives.

Other objects and features of the present invention will become apparent from the following detailed description considered in connection with the accompanying drawings which disclose an embodiment of the present invention.

In the drawings wherein similar reference characters denote similar elements throughout the several views.

Figure 1:
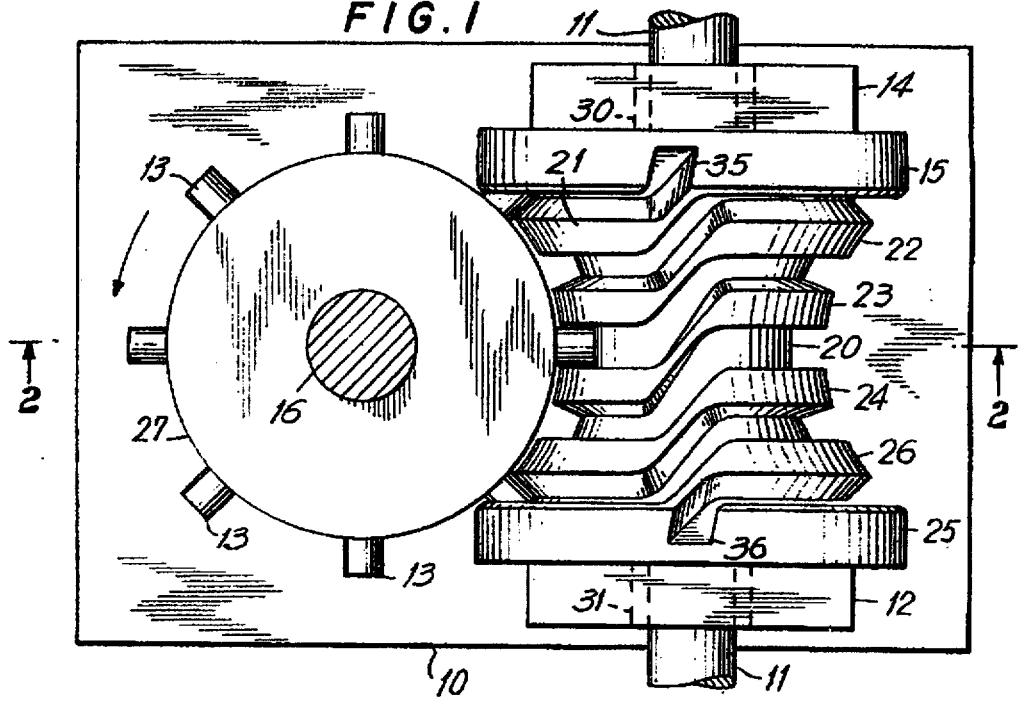
FIGURE 1 is a top plan view of the gear index drive according to the invention.
Figure 2:
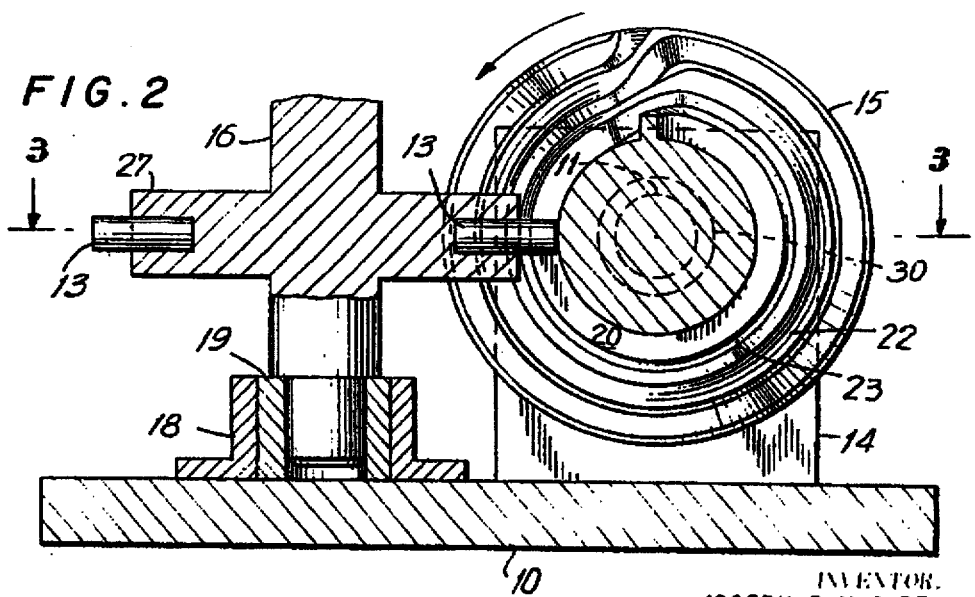
FIG. 2 is a view taken along section 2—2 of FIG. 1.
Figure 3:
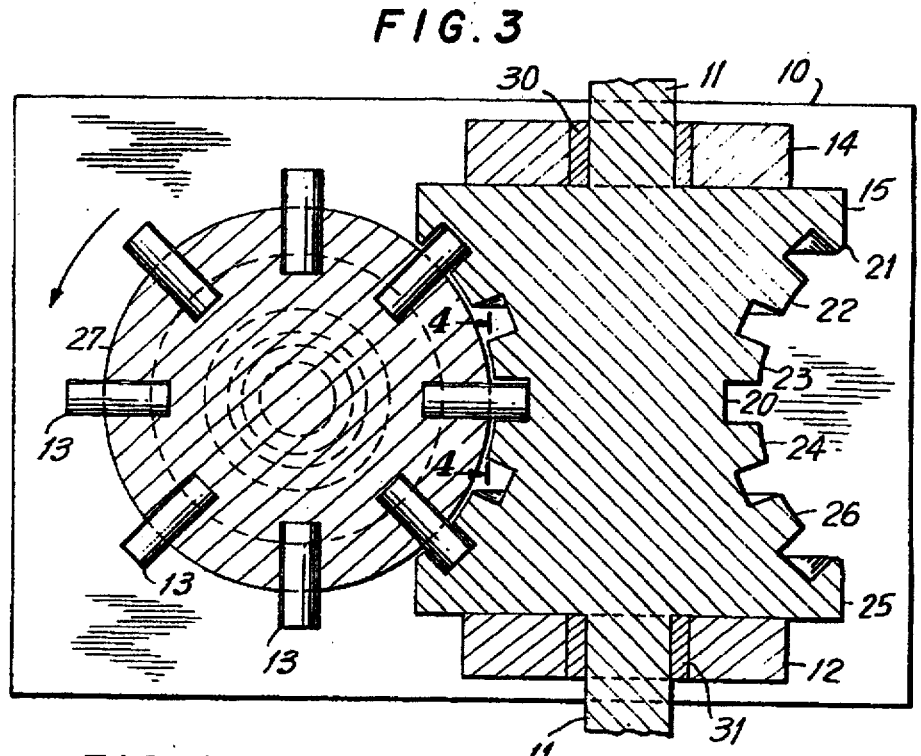
FIG. 3 is a cross-sectional view taken along section 3—3 of FIG. 2.

Referring to all of the figures, and in particular FIGS. 1 and 2, there is shown mounted on stand 10 a roller gear or rotary member mounted on shaft 11 so that it is pivotably supported through bearings 30 and 31 in parallel spaced apart mounting blocks 12 and 14. The roller gear includes end flanges 15 and 25 integrally formed therewith for supporting therebetween hub 20 having a concave profile. On the surface of hub 20 are integrally formed threads or cam ribs 21, 22, 23, 24 and 26 which provide a modified trapezoidal cam contour on hub 20.

Cam wheel 27 is pivotably mounted at right angles to the roller gear on shaft 16 and includes a plurality of radially spaced apart cam folowers 13 projecting from its rim, and in engagement with the contoured slots between ribs 21–24 and 26. Shaft 16, shown for the purposes of illustration, is pivotably mounted in thrust bearing 19 contained within flange 18.

Cam followers 13 may be pivotably retained within cam wheel 27 by means of bushings or roller bearings so that they may rotate freely when in contact with the sides of the contoured slots of the roller gear. The concave profile of he roller gear permits the maximum engagement of cam followers 13 in the contoured slots between ribs 21–24 and 26. The hub surface of each slot is prescribed in a circular profile with the locus of its center identical with that of the axis of cam wheel 27. In a similar manner, the profile of the projecting surfaces of ribs 21–24 and 26 also forms a circular cross-section having its center on the axis of cam wheel 27.

Figure 4:
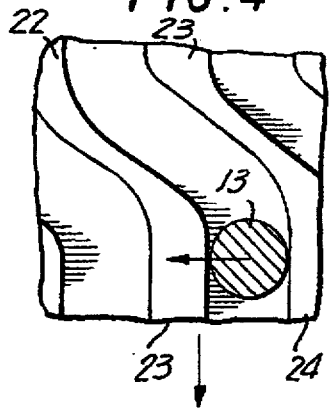
FIG. 4 is a view partly in cross-section taken along line 4—4 of FIG. 3 for one position of the components.
Figure 5:
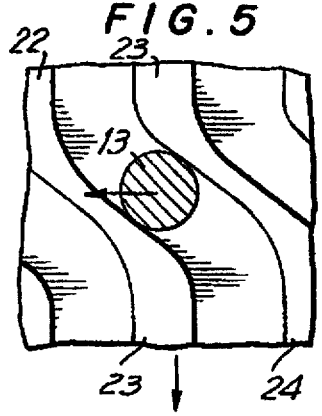
FIG. 5 shows another position of the components of FIG. 4.
Figure 6:
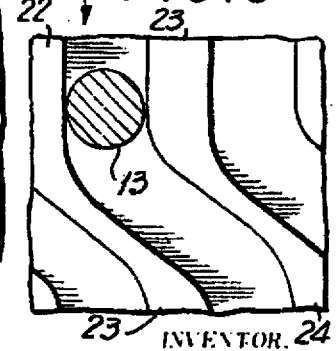
FIG. 6 shows a third position of the components of FIG. 4.

In the embodiment shown, with cam followers 13 spaced at 45 degree intervals, each complete rotation of the roller gear will index cam wheel 27, 1/16 of a revolution. It is obvious that other gear ratios are possible with different spacings of cam ribs and cam followers. The counter-clockwise rotation of the roller gear as shown in FIG. 2 will cause cam wheel 27 to index counter-clockwise as viewed in FIG. 1. The indexing of cam wheel 27 occurs when cam followers 13 enter the trapezoidal transition portion of cam ribs 21–24 and 26, and rotate through the plane of cam wheel 27 as shown in detail in FIGS. 4–6. FIG. 4 illustrates a detail section of the engagement of cam ribs 22–24 with cam follower 13 prior to entry into the transition region, which defines the index time of the roller gear. As the roller gear rotates further the trapezoidal walls of ribs 22 and 23, and 23 and 24, urge cam follower 13 to advance to the left through the transition, (shown in FIG. 5) and then into the slot defined between ribs 22 and 23, in a continuous motion as shown in FIG. 6. In the present embodiment, the index time is 22½° of arc and the balance dwell time is the remaining portion of the circle of rotation of the rotary member. In a similar manner, two other cam followers 13 undergo a similar and simultaneous transition between the other slots in the roller gear. During every second revolution of the roller gear shown in the embodiment, one cam follower will emerge from slot 35 in hub 15 while another cam follower will enter into slot 36 in hub 25 to begin its engagement with the roller gear. Three cam followers of this embodiment remain in continuous engagement with the roller gear during its operation.

It is obvious from the construction of the apparatus according to the invention that the indexing of cam wheel 27 may be effected for directions of rotation of the roller gear since the components are symmetrically designed. The multiple engagement of cam followers 13 with the roller gear permits the indexing of loads having high torque requirements. Moreover, the gradual contour of the transition slots significantly reduces the friction between the cam followers and the roller gear to permit long life and efficient operation of the indexing components.

While only a single embodiment of the present invention has been shown and described, it will be understood that many changes and modifications may be made thereunto without departing from the spirit and scope of the invention.

What is claimed is:
1. A spherical worm gear indexing device comprising;
   a rotary member,
   a plurality of annularly spaced cam ribs disposed on the hub of said rotary member and forming slots, said ribs having a circularly concave profile,
   at least one transverse contoured slot connecting each of said adjacent cam ribs to form a continuous slot on the drum of said rotary member, said rotary member having at least one entrance and exit slot, adjacent to the ends of its hub along the line defining said contour slots, and
   cam follower means for engagement with the slots between said ribs, said ribs having the same circle of rotation as said cam follower means so as to permit continuous engagement and disengagement of said cam follower means with said rotary member.

2. The device as recited in claim 1 wherein the surface of said drum defines a circularly concave profile having the same circle of rotation as said cam follower means.

3. The device as recited in claim 1 wherein said cam follower means comprises a cam wheel pivotably mounted adjacent to the external surfaces of said cam ribs with its axis of rotation on the center of the circular arc defined by said rib surfaces, and a plurality of radially spaced apart cam followers projecting from the periphery of said cam wheel and in engagement with the slots defined between said adjacent cam ribs.

4. The device as recited in claim 3 wherein at least two cam followers are in continuous engagement with the slots of said rotary member at all times.

5. The device as recited in claim 4 wherein each of said cam followers are cylindrically shaped having a diameter slightly smaller than said cam slots.

6. The device as recited in claim 4 wherein each rotation of said rotary gear causes said cam wheel to advance $\frac{1}{16}$ of a revolution.

7. The device as recited in claim 6 wherein the index time of said rotary member is 22½ degrees of arc, and the dwell time is the remainder of the circle of rotation of said rotary member.

References Cited
UNITED STATES PATENTS

| | | | |
|---|---|---|---|
| 1,231,062 | 6/1917 | Pietzsch et al. | 74—426 |
| 1,902,683 | 3/1933 | Wildhaber | 74—458 |
| 1,920,969 | 8/1933 | Carpenter. | |
| 3,144,249 | 8/1964 | Bryer | 74—424.5 X |
| 3,181,379 | 5/1965 | Petroff | 74—84 |
| 3,199,373 | 8/1965 | Veale | 74—84 X |

LEONARD H. GERIN, Primary Examiner

U.S. Cl. X.R.

74—84, 415